VIBRATING REED OSCILLATOR CONTROLLER

Filed Dec. 11, 1956

2 Sheets-Sheet 1

INVENTOR

Henry P. Birkemeier

BY Burns, Doane, Benedict & Irons

ATTORNEYS

VIBRATING REED OSCILLATOR CONTROLLER

Filed Dec. 11, 1956

INVENTOR
Henry P. Birkemeier
BY Burns, Doane, Benedict & Irons
ATTORNEYS

1

2,872,598

VIBRATING REED OSCILLATOR CONTROLLER

Henry P. Birkemeier, Chicago, Ill., assignor, by mesne assignments, to Bell & Gossett Company, Morton Grove, Ill., a corporation of Illinois Application December 11, 1956, Serial No. 627,595
11 Claims. (Cl. 310—25)

This invention relates to controllers for oscillating systems, and, more particularly, to frequency controllers for audio oscillators.

Audio oscillators are used in many types of applications, such as in various types of communication systems. In these systems it is required that the oscillator frequency be held within very narrow limits. Stabilizing means for oscillators for such purposes have been designed which include resistance and capacitance networks, crystals, and other elements, but such controllers have not proved practical for low frequency operation. The alternative proposed has been the use of a reed or tuning fork control for the audio oscillator, but reed and tuning fork controls previously designed have been so complicated as to be too expensive or impractical for such use. The purpose of this invention is the design of a controller for an audio oscillator which is extremely simple in its structure and which can be readily manufactured, yet will be extremely stable in operation. A particularly important feature of the apparatus is the novel arrangement of pole members of the pickup coil.

A further advantageous feature of the apparatus of this invention is the mounting structure, which positions all elements in such fashion that defective parts can readily be replaced without disturbance of other elements and in such fashion that the parts are all positively held in proper positions.

The apparatus of the invention, generally speaking, includes a driver which comprises a magnetic core and a coil wound thereon, positioned between a pair of elongated reeds. Mounted perpendicularly to the driver coil and also between the reeds is a pickup core carrying a pickup coil. As indicated above, the pickup core has pole pieces, each of which is linked to the inner side of one reed and the outer side of the other reed. The reeds are supported for oscillating motion under the influence of the driver coil by a mounting plate which is resiliently supported from the base of the apparatus.

The invention will now be more particularly described in conjunction with the accompanying drawings showing a preferred embodiment of the invention.

2

Figure 8:
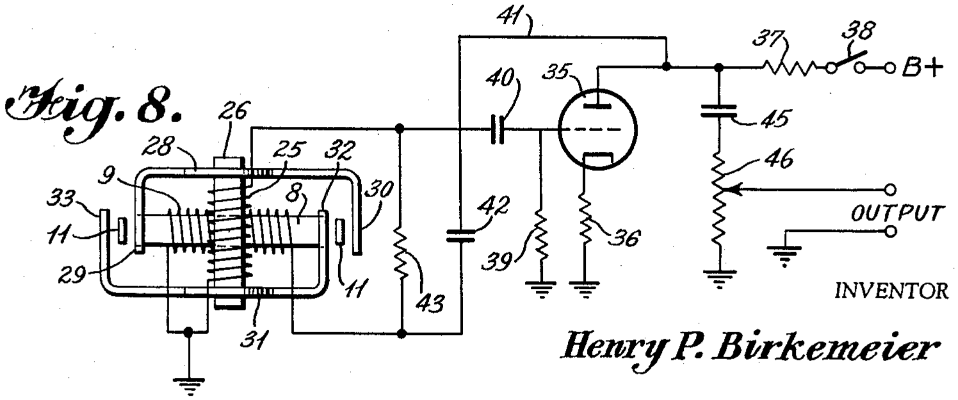
Figure 4:
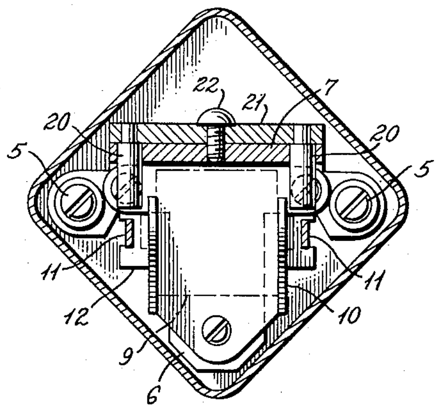
Fig. 4 is a sectional view taken along line 4—4 of Fig. 2.
Figure 5:
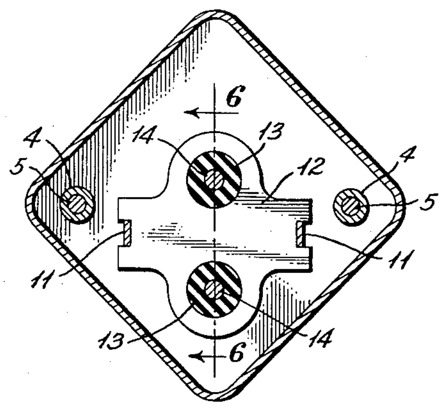
Fig. 5 is a sectional view taken along line 5—5 of Fig. 2.
Figure 6:
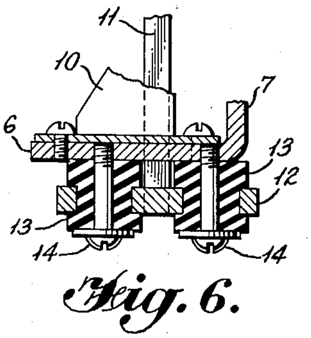
Fig. 6 is a partial sectional view showing the resilient mounting means taken along line 6—6 of Fig. 5.

Fig. 8 is a schematic diagram showing the connections of the vibrator controller into an oscillator system.

Figures 1, 2, 3:
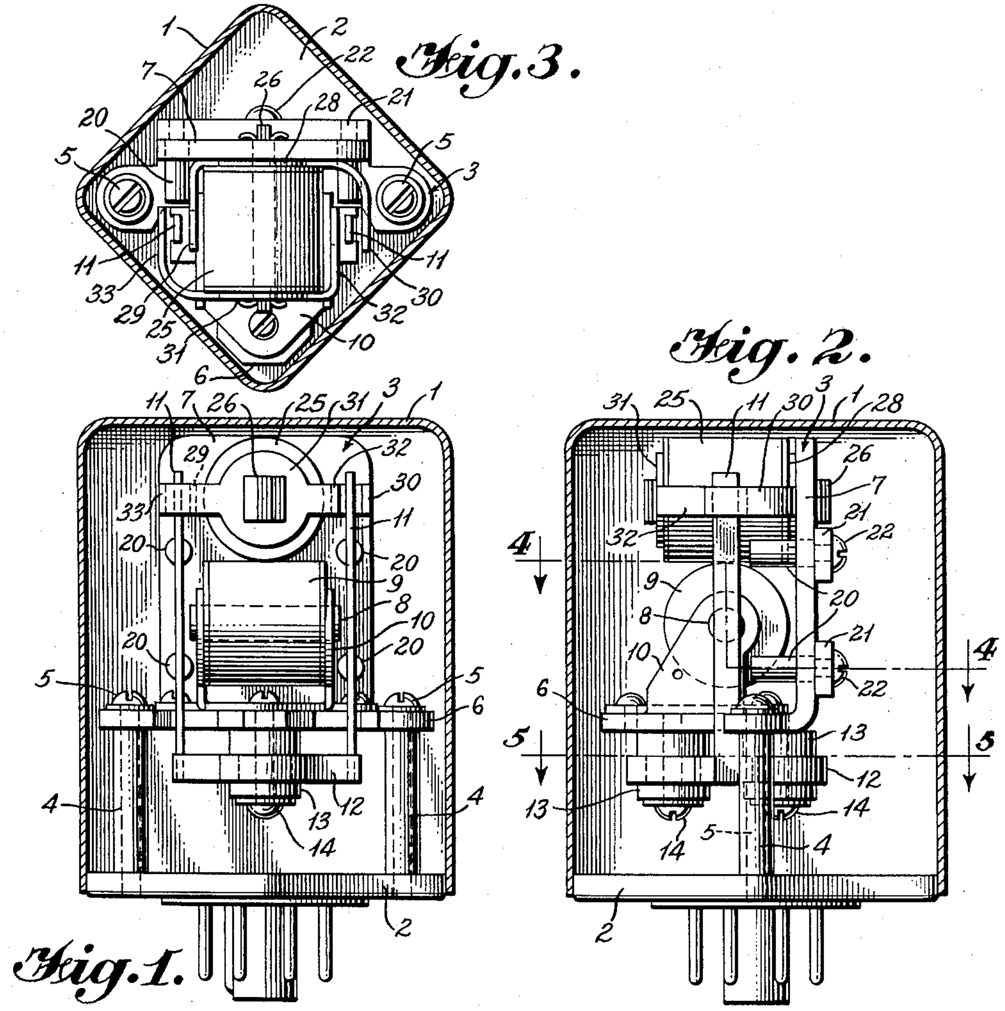
Fig. 1 is an elevational view of the apparatus of the invention with the cover shown in section.
Fig. 2 is an elevational view corresponding to Fig. 1 and taken at right angles with respect to that figure.
Fig. 3 is a top plan view of the apparatus of Fig. 1 with the top of the cover omitted.

Referring first to Fig. 1, the controller comprises a cover 1 which cooperates with an octal plug 2. Supported from the plug 2 is a base 3 spaced above the plug by a pair of sleeves 4. The base is held in place by a pair of bolts 5 which rigidly fix the base to the sleeves 4 and the sleeves to the plug 2.

Figure 7:
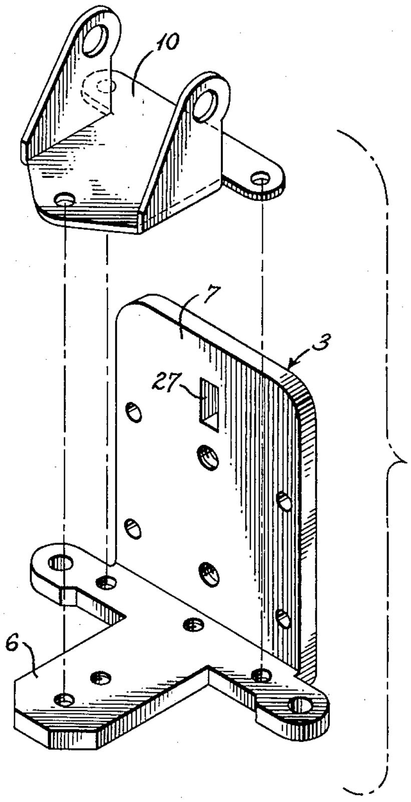
Fig. 7 is an exploded perspective view of the base and the mount for the driver coil.

The base 3, as more clearly shown in Fig. 7, includes a horizontal portion 6 and a vertically-extending portion 7. A driver core 8 and coil 9 are supported above the horizontal portion of the base by a support member 10 (also shown in Fig. 7) which is bolted to the horizontal portion of the base.

The driver coil 9 is mounted between a pair of vertically extending elongated reeds 11 which have their lower ends fixed, as by welding, to a rigid plate 12.

The mounting plate 12 is resiliently supported from the horizontal portion of the base 3 by means including a pair of rubber grommets 13 which extend through holes in the mounting plate. Bolts 14 extend through the central passages of the grommets and are threaded into the horizontal portion 6 of the base.

The reeds 11 are of ferromagnetic material and are magnetized by means of permanent magnets 20. The permanent magnets are preferably of the usual cylindrical type and extend outwardly from the vertically-extending portion 7 of the base into adjacency with the sides of the reeds parallel to the plane of vibration thereof. The polarity of the permanent magnets 20 is such that a north pole of each of the two magnets associated with one reed is immediately adjacent the reed, while the south poles of the magnets associated with the other reed are immediately adjacent that reed. Thereby, one of the reeds acts as a north pole and the other as a south pole of a magnetic circuit. A portion of that magnetic circuit is completed through a pair of magnet holder bars 21 which link the ends of two of the permanent magnets 20 together, with the south pole of one magnet associated with one reed coupled through the ferromagnetic bar 21 to the north pole of the magnet associated with the other reed. Screws 22 hold the bars 21 against the side of the vertically-extending portion of the base, so that the permanent magnets are held fixed in position.

Also mounted between the reeds 11 is a pickup coil 25 which is wound about a bar-type core member 26, formed of ferromagnetic laminations. The laminations of the core member 26 extend at one end of the coil through a slot 27 in the vertically-extending portion of the base and some are folded over so as to hold the core and coil positively with respect to the base. Some of the laminations of the opposite end of the core bar are also folded over to hold the coil form positively. The pickup coil 25 and the driver coil 9 are at right angles so that inductive coupling therebetween is avoided, without the use of shields.

One end of the coil, the upper end as shown in Fig. 3, has a ferromagnetic pole piece 28 which is held against the coil form by the clamping action of the core bar 26 and which has one end portion 29 and a second end portion 30 which are bent around with respect to the associated end of the coil to form a substantially U-shaped structure. The end portion 29 is positioned at the inner side of one of the reeds 11, while the end portion 30 is positioned at the outer side of the other reed. In similar fashion, the opposite end of the coil has a ferromagnetic pole piece 31 which has end portions 32 and 33. Portion 32 extends adjacent the inner side of one of the reeds, while the portion 33 extends adjacent the outer side of the other reed. By this arrangement, each reed is positioned between portions of the pole pieces of opposite ends of the pickup coil 25. As is best seen in Fig. 2, the end portions of the pole pieces are preferably overlapping to assure the best magnetic coupling possible.

It will be evident from the above that, when a pulsating current is applied to the driver coil 9, at one instant one end of the associated core bar 8 will be of one polarity and the other end of the opposite polarity, and these polarities will switch back and forth. If the right hand end of the core 8 in Fig. 1 is a north pole at one instant and the adjacent reed 11 is a south pole, so that the opposite end of the core is a south pole and the adjacent reed a north pole, both of the reeds 11 will be attracted toward the core bar. During the opposite half cycle of the current in the driver coil, both of the reeds will be repelled from the core bar. Thereby, each reed is caused to oscillate in a plane containing both reeds. The sizes of the reeds of course determine their natural frequency, so that different size reeds may be used for control of different frequency oscillators.

Considering now the action of the pickup coil, when no current is supplied to the driver coil, the reeds 11 are equidistant between the adjacent portions of the pole pieces. Therefore, since the magnetic circuits through the pole pieces and the air gaps between the reeds and the pole pieces are identical, there will be no magnetomotive force between the ends of core 26 so that no flux will link the pickup coil. However, when the reeds 11 move toward and away from each other, the air gap reluctances change in such fashion that an alternating magnetomotive force exists across the core 26, so that an alternating flux links the pickup coil and an alternating voltage is induced therein.

It will be evident that the change in reluctance of the flux paths and therefore the change in magnetomotive force drop across the core 25 is doubled by having the pole piece for one end of the pickup coil adjacent the inner side of one of the reeds and the outer side of the other reed.

In order that temperature changes may have no effect on the sizes of the air gaps in the driver coil and pickup coil magnetic circuits, it is preferred that the mounting plate 12, the core bars 8 and 26, and the pole pieces 28 and 31 be of materials having the same thermal coefficients of expansion. With this condition met the frequency of oscillation of the reeds will be stable despite any temperature changes.

In the manufacturing operation, after the parts have been assembled in the form described above, the controller may be tested. Defective parts may readily be replaced without disturbing other parts because of the advantageous arrangement illustrated. Also the natural frequency of vibration may be adjusted to the exact value desired, as by slightly bending the pole pieces with respect to the reeds. When the controller operates properly, the cover and plug may be secured together in such fashion as to hermetically seal the controller.

Turning now to Fig. 8, a practical oscillator employing the vibratable reed controller described above will now be disclosed. The oscillator includes a triode vacuum tube 35 having a cathode resistor 36 connected to ground, and its plate connected through the series combination of a resistor 37 and an on-off switch 38 to a source of positive voltage indicated as B+. The grid circuit includes a D.-C. return resistor 39, and the pickup coil is coupled to the grid through a capacitor 40 whose side remote from the grid is connected to one end of the pickup coil 25. The other end of the pickup coil is grounded. Current for operation of the driver coil 9 is supplied from the B supply through a lead 41 which is connected through a capacitor 42 to one end of the driver coil. The other end of the driver coil is grounded. The ungrounded end of the driver coil is connected through a resistor 43 to the side of capacitor 40 remote from the grid.

Capacitor 42 and resistor 43 operate as a phase shift network to furnish a pure sine wave output in the triode plate circuit. Since their sizes must correspond with the controller frequency, they may be mounted within the controller cover.

When the switch 38 is closed, a transient current flows through capacitor 42 and the driver coil 9, thus either attracting both of the reeds toward the coil or repelling both reeds. Through the action of the vibrating reeds described above and the magnetic circuit including the core 26 of the pickup coil, a voltage is induced in the pickup coil. That voltage is applied through capacitor 40 to the grid of the triode, thus reinforcing the transient in the driver coil. Through the plate to grid coupling, the oscillations build up to an amplitude determined by the parameters of the system, and the oscillations are at a frequency determined by the natural frequency of the vibrating reeds. The oscillatory energy may be taken from the system through a D.-C. blocking capacitor 45 and potentiometer 46.

It will be evident that a vibrating reed controller has been described which is relatively simple in construction, yet will operate with precision to furnish a substantial voltage for control of an oscillator. The controller is also not limited to such use but rather may be used as an electromechanical filter.

Though the apparatus has been described with the coil 25 as the pickup coil, that coil could be used as the driver coil and the coil 9 used as the pickup coil. Ordinarily, however, it will be preferred to use the coil 25 as the pickup coil because of the voltage amplification obtained with the novel pole piece arrangement associated with that coil. Of course, this novel arrangement could be used for both driver and pickup coils, if desired.

The parts of the controller are so mounted that they will function properly in operation, yet during the manufacturing procedure they can be installed without problems caused by overlapping mounting of parts. Moreover, if, in the testing procedure, one or more of the parts is found to be faulty, that part may be replaced wthout replacing or removing the other parts. The simple yet effective mounting arrangement, and the reinforcing action obtained by the novel pole piece arrangement contributes very importantly to operation of the controller.

It will be evident that many minor changes could be made in the apparatus specifically described without departure from the scope of the present invention. Therefore, the invention is not to be considered limited to the specific embodiment disclosed in the drawings, but rather is limited only by the scope of the appended claims.

I claim:

1. A vibratable reed controller comprising a base, a pair of spaced substantially parallel elongated ferromagnetic reeds, a mounting member supporting each reed at one end thereof from the base, each of the reeds having an outer side and an inner side extending at an angle to the plane of vibratory movement of the reeds, said reeds being magnetized with the reeds being of opposite magnetic polarity, means for moving the reeds reciprocably in said plane including a first coil surrounding a first magnetic core, and a magnetic pickup including a second coil surrounding a second magnetic core, at least one of said moving means and pickup having ferromagnetic pole means for one end of its coil extending between the inner side of one of the reeds and the outer side of the other reed and ferromagnetic pole means for the opposite end of its coil extending between the outer side of said one reed and the inner side of said other reed.

2. The appparatus of claim 1 including means for resiliently supporting the mounting member from the base for reducing coupling between said reeds and said base.

3. A vibratable reed controller comprising a base, a pair of spaced substantially parallel elongated ferromagnetic reeds, a mounting member supporting each reed at one end thereof, means for resiliently supporting the mounting member from the base for reducing coupling between said reeds and said base, each of the reeds having an outer side and an inner side extending at an angle to the plane of vibratory movement of the reeds, said reeds being magnetized with the reeds being of opposite magnetic polarity, means for moving the reeds reciprocably in said plane, a magnetic pickup including a coil surrounding a magnetic core, ferromagnetic pole means for one of the coil extending between the inner side of one of the reeds and the outer side of the other reed, and ferromagnetic pole means for the opposite end of the coil extending between the outer side of said one reed and the inner side of said other reed, whereby a voltage of a frequency determined by the natural frequency of the reeds is induced in the coil.

4. The apparatus of claim 1 in which said mounting member is a rigid plate provided with a hole therethrough, said reeds being fixed to opposite ends of the plate, and said supporting means includes a rubber grommet extending within said hole and a screw threaded into the base and extending through the grommet to hold the grommet with respect to the base.

5. The apparatus of claim 1 in which said moving means includes a coil wound around a magnetic core with the opposite ends of the core adjacent the inner sides of the reeds.

6. A vibratable reed controller comprising a base, a pair of spaced parallel elongated ferromagnetic reeds, a mounting member supporting each reed at one end thereof, means for resiliently supporting the mounting member from the base for reducing coupling between said reeds and said base, each of the reeds having an outer side and an inner side extending at an angle to the plane of vibratory movement of the reeds, said reeds being magnetized with the reeds being of opposite magnetic polarity, a first coil wound around a first magnetic core and extending between the reeds with one end of the first core adjacent the inner side of one reed and the opposite end adjacent the inner side of the other reed, a magnetic pickup mounted between the reeds and including a second coil surrounding a second magnetic core, ferromagnetic pole means for one end of the second coil extending between the inner side of one of the reeds and the outer side of the other reed, and ferromagnetic pole means for the opposite end of the coil extending between the outer side of said one reed and the inner side of the other reed, whereby a voltage of a frequency determined by the natural frequency of the reeds is induced in the second coil.

7. The apparatus of claim 6 including permanent magnets having opposite poles adjacent sides of the reeds parallel to said plane and ferromagnetic linking means between the permanent magnets.

8. The apparatus of claim 6 in which said base includes a pair of substantially perpendicularly-extending portions, said screw being threaded into one portion and said first and second coils being supported from the portions.

9. A vibratable reed controller comprising a base having a pair of substantially perpendicularly-extending portions, a pair of spaced parallel elongated ferromagnetic reeds, a rigid mounting plate to opposite ends of which one end of each reed is fixed, said mounting plate having a pair of holes therethrough, means for resiliently supporting the mounting plate comprising a pair of rubber grommets in said holes in the mounting plate and screws extending through the grommets and threaded into one of said pair of portions of the base, said resilient supporting means thereby reducing coupling between said reeds and said base, each of the reeds having an inner side and an outer side extending at an angle to the plane of vibratory movement of the reeds, permanent magnets extending from the other portion of the base adjacent sides of the reeds which are substantially perpendicular to said inner and outer sides, there being at least one magnet for each reed and the end of the magnet next adjacent one reed being of opposite polarity from the end of the magnet next adjacent the other reed, a ferromagnetic bar linking the opposite ends of the permanent magnets and attached to said other portion of the base, a first coil surrounding a first ferromagnetic core bar, means mounting said first coil and said first core bar between the reeds with one end of the bar adjacent the inner side of one reed and the opposite end of the bar adjacent the inner side of the other reed, so that pulsating current through said first coil will cause oscillating motion of the reeds in said plane, a magnetic pickup including a second coil surrounding a second ferromagnetic core bar, the second core bar and second coil being mounted on said other portion of the base and with the coil turns of the second coil and those of the first coil substantially perpendicular to each other so that current through the first coil has no appreciable effect on the second coil, the second coil having a ferromagnetic pole member at one end thereof having one end adjacent the inner side of one reed and another end adjacent the outer side of the other reed and a second ferromagnetic pole member at the opposite end of the second coil having one end adjacent the outer side of said one reed and another end adjacent the inner side of the other reed, whereby a voltage of frequency determined by the natural frequency of the vibrating reeds is induced in the second coil.

10. A vibratable reed controller comprising a base, a pair of spaced parallel elongated ferromagnetic reeds, a rigid mounting plate on opposite ends of which one end of each reed is fixed, means resiliently supporting the mounting plate on said base to reduce coupling between said reeds and said base, each of said reeds having an inner side and an outer side extending at an angle to the plane of vibratory movement of the reeds, permanent magnets carried by said base and extending to points adjacent said reeds, there being at least one magnet for each reed and the end of the magnet next adjacent one reed being of opposite polarity from the end of the magnet next adjacent the other reed, a ferromagnetic bar linking the opposite ends of the permanent magnets, a first coil surrounding a first ferromagnetic core bar, means mounting said first coil and said first core bar between the reeds with one end of the bar adjacent the inner side of one reed and the opposite end of the bar adjacent the inner side of the other reed, a second coil surrounding a second ferromagnetic core bar, the second core bar and second coil being mounted with the coil turns of the second coil and those of the first coil substantially perpendicular to each other so that current through the first coil has no appreciable effect on the second coil, the second coil having a ferromagnetic pole member at one end thereof having one end adjacent the inner side of one reed and another end adjacent the outer side of the other reed and a second ferromagnetic pole member at the opposite end of the second coil having one end adjacent the outer side of said one reed and another end adjacent the inner side of said other reed.

11. A vibratable reed controller comprising a base having a pair of substantially perpendicular extending portions, a pair of spaced parallel elongated ferromagnetic reeds, a rigid mounting plate on opposite ends of which one end of each reed is fixed, means resiliently supporting the plate on one of said pair of portions of the base, said resilient supporting means thereby reducing coupling between said reeds and said base, each of the reeds having an inner side and an outer side extending at an angle to the plane of vibratory movement of the reeds, permanent magnets extending from the other portion of the base to a point adjacent said reeds, there being at least one magnet for each reed and the end of the magnet next adjacent one reed being of opposite polarity from the end of the magnet next adjacent the other reed, a ferromagnetic bar linking the opposite ends of the permanent magnets and attached to said other portion of the base, a first coil surrounding a first ferromagnetic core bar, means mounting said first coil and said first core bar between the reed with one end of the bar adjacent the inner side of one reed and the opposite end of the bar adjacent the inner side of the other reed, a second coil surrounding a second ferromagnetic bar, the second core bar and second coil being mounted on said other portion of the base and with the coil turns of the second coil and those of the first coil substantially perpendicular to each other so that current through the first coil has no appreciable effect on the second coil, the second coil having a ferromagnetic pole member at one end thereof having one end adjacent the inner side of one reed and another end adjacent the outer side of the other reed and a second ferromagnetic pole member at the opposite end of the second coil having one end adjacent the outer side of said one reed and another end adjacent the inner side of the other reed.

References Cited in the file of this patent

UNITED STATES PATENTS 2,547,027 Winkler ---------------- Apr. 13, 1951